United States Patent Office 3,758,313
Patented Sept. 11, 1973

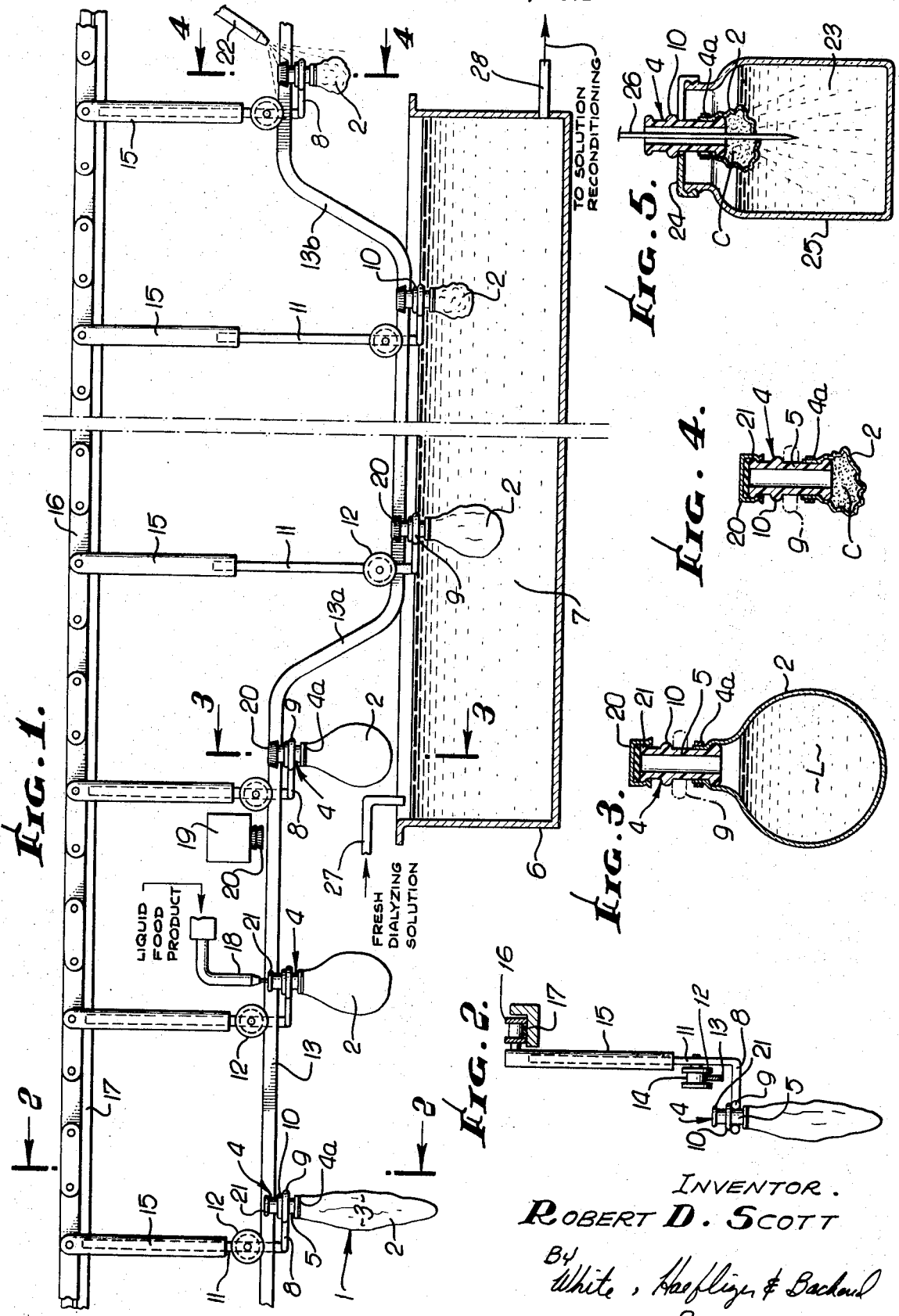

3,758,313
DEHYDRATION AND PACKAGING OF
FOODSTUFFS BY DIALYSIS
Robert D. Scott, 1324 S. Glenn Alan,
West Covina, Calif. 91890
Filed Mar. 24, 1971, Ser. No. 127,675
Int. Cl. A23c 1/00; A23l 1/02
U.S. Cl. 99—199                4 Claims

ABSTRACT OF THE DISCLOSURE

A food concentrate is prepared in the container by dialysis of a liquid food product portion sealed in a film bag or other container having a semi-permeable membrane wall, against a suitable aqueous salt dialyzing solution.

BACKGROUND OF THE INVENTION

This invention has to do with food concentrates e.g. concentrates of orange juice, coffee or any myriad of other foodstuffs for humans or pets, which are prepared in their sales package, to be reconstituted with water by the consumer. More particularly, the invention is concerned with novel food product concentrate preparation and packaging, and methods and apparatus therefor.

Food concentrates, food products suitable for reconstitution upon replacement of earlier removed water, are widely available as "instant" foods e.g. instant coffee and frozen "orange juice" concentrate. Techniques for removal of water to form the concentrate have been developed as compromises between adaptability to low cost, high volume production needs and the desirability of having a concentrate restorable as nearly as may be to the original product consistency, flavor and aroma. Delicate components of the food, essential to the reconstituted products' original appeal can be lost by use of heat in processing or even unduly high vacuum conditions, either condition in excess tending to destroy the subtle balance nature has provided in the product.

PRIOR ART

As suggested above, separation of water from foodstuffs as widely practiced has been by application of heat and/or vacuum to drive off the water. There have been suggestions in the literature and perhaps too some use of dialysis to remove certain components from liquid foods. To my knowledge such suggestions have been on an academic plane see e.g. article: "Dialyzer Concentrates Beverages" in Food Engineering for April 1966.

SUMMARY OF THE INVENTION

It is a major objective of my invention to provide liquid foodstuff concentrates through the use of dialysis, but in a rapid, commercial manner, which concentrates and packages the product in a single operation.

In an important aspect, the invention packages a liquid foodstuff in its retail package and removes water from the packaged foodstuff through the wall of the package, which comprises a dialysis membrane.

These advantages among others accrue from the present invention:

There is reduced handling of the food product;
Bacteria are destroyed by the osmotic pressure across the dialysis membrane, so the concentrate is sealed in a sanitary state;
Production costs are minimized;
The consumer receives an easily handled package, ready for use;
Heat exposure is minimal, so that delicate organoleptic factors are not lost or destroyed;
Automated handling is facilitated;

A great variety of different foodstuffs can be packaged on the same equipment with only minimal changes, if any.

In particular, the invention provides a food product package comprising a sealed container having a dialytically responsive wall, such as a bag formed of semi-permeable membranous film, and a food product concentrate therein consisting of the non-dialyzable portion of the food product. The bag typically has a sealable filler opening and means adjacent the opening for supporting the bag during filling operations.

Method is provided by the invention for preparing packaged food concentrates which includes sealing a liquid food portion to be concentrated in a container having a wall comprising a semi-permeable membrane, and dialyzing the food product through the membrane against a dialyzing solution therefor to remove water from the food product sealed within the container. The method further contemplates maintaining a bath of dialyzing aqueous salt solution e.g. at a temperature between 40 and 200° F. and preferably to 120° F., and immersing the sealed container therein for food product dialysis. The container preferably takes the form of a bag comprising a flexible, semi-permeable film having a sealable filler opening. The method then includes filling the bag through its filler opening with the food portion to be concentrated, sealing the bag opening and immersing the bag in a dialyzing aqueous salt solution to concentrate the food portion contents of the bag.

In a specific embodiment of the present invention, particularly adapted for high speed automated production, the method includes advancing a series of individual food containers having a wall portion comprising a semi-permeable membrane to a fill station, filling the food product to be concentrated e.g. orange juice or milk into the containers in sequence at the fill station, sealing each food product portion in its individual container, immersing the containers in a bath comprising a dialyzing aqueous salt solution e.g. a solution of sodium chloride in water at a temperature between 40° F. and 120° F. and a concentration between 1% and 10% by weight in a manner and for a time to dehydrate the food product through the dialysis membrane wall portion of the container, e.g. to remove from 50% to 90% of the product water and thereafter withdrawing the containers from the bath. The containers may be bags formed of flexible semi-permeable film, e.g. cellulosic, proteinaceous or synthetic organic polymeric film which is differentially permeable to food product components.

Apparatus is provided for carrying out the foregoing method comprising means to fill with food product to be concentrated a series of containers each having a wall portion comprising a semi-permeable membrane, means to seal said containers after the filling thereof, and means to dehydrate the container contents including an immersion bath of a dialyzing aqueous salt solution for said containers. The apparatus typically includes means adapted to grasp the containers and to move the grasped containers through the bath. The immersion bath generally comprises a longitudinally extended trough, adapted to contain the bath solution and to receive the containers in solution submerged relation for movement through the bath. The apparatus may further include means beyond the bath to rinse salt solution from the containers withdrawn from the bath.

BRIEF DESCRIPTION OF THE DRAWINGS

In the drawings:
FIG. 1 is a somewhat diagrammatic view in side elevation of one form of apparatus according to the invention for carrying out the present methods;
FIG. 2 is a cross-sectional view thereof taken on line 2—2 in FIG. 1;

FIG. 3 is a cross-sectional view, somewhat enlarged, of a filled container bag, prior to dialysis, according to the invention, and taken on line 3—3 in FIG. 1;

FIG. 4 is a view like FIG. 3, of a filled container but following dialysis and taken along line 4—4 in FIG. 1; and FIG. 5 is a view in vertical section of a package according to the invention being ruptured to reconstitute the contained concentrate in a jar of water.

DESCRIPTION OF THE PREFERRED EMBODIMENTS

With reference now to the drawings, in FIGS. 1–4 apparatus is depicted for carrying out the present method. As shown, containers 1 in the form of flaccid bags 2 of flexible, semi-permeable film 3 with a relatively rigid filler neck ring 4 of plastic or metal sealably secured thereto as by clamp 4a to provide a neck 5 projecting above the bag proper are advanced toward trough 6 containing an aqueous salt solution 7 to be used as a dialyzing solution. The bags 2 are supported for advancement by arm 8 having fingers 9 engaged with the underside of annular shoulder 10 which may be integrally formed with filler neck ring 4 or otherwise fixed thereon, see FIG. 2. Arm 8 projects horizontally from the lower end of rod 11. A guide roller 12 is journaled on the lower portion of rod 11 above arm 8 and engages rail 13 in its center groove 14. The upper portion of rod 11 is slidably received in sleeve 15 carried in downwardly projecting relation by drive chain 16 moving on track 17 between sprockets (not shown). The arrangement of rod 11 and sleeve 15 permits vertical movement of the rod and corresponding vertical adjustment of arm 8 and fingers 9 as required for guide roller 12 to track on rail 13.

The bags 2 are placed on fingers 9 by hand or by other means not shown and advanced by operation of chain 16 to a filling station including a filling nozzle 18 leading from a food supply (not shown) which fills bags indexed to it with controlled portions of liquid foodstuffs L which are to be concentrated in the bags according to the invention, see FIG. 3.

Beyond the filling station a sealing station is provided here shown as capper 19 which applies caps 20 onto the lips 21 of filler neck ring 4. Alternatively the bags may be heat sealed, hot melt sealed or sewn, taped or otherwise sealed around the filled foodstuff. The closure is air tight whatever the sealing method.

The filled and sealed bags 2 are advanced to trough 6 and immersed in the dialyzing salt solution 7 as the guide roller 12 traverses the downwardly curving portion 13a of rail 13, extending rod 11 from its sleeve 15 and lowering the arm 8 to just above the bath solution. Complete immersion of the bag 2 portion containing the food is desirable to maximize dialysis efficiency. After a period of time during which the bag 2 is moved through the trough 6, which as indicated is of indeterminate length and may be serpentine or provided wth various immersion time prolonging expedients, sufficient to dialyze the packaged food product, the bag, now shriveled by the loss of water from the now concentrated product C therein, to the bath solution and the absence of air in the bag due to pre-immersion sealing (see FIG. 4) is withdrawn from the bath as guide roller 12 rides along upwardly curving portion 13b of rail 13, the rod 11 being accordingly resintered into sleeve 15.

A rinse station comprising a water spray nozzle 22 is provided to rinse the salt from the bag 2, primarily for aesthetic reasons. The bag is then advanced to packaging and labeling operations (not shown) and ultimately shipped to the market for purchase by the consumer.

Reconstitution of the dehydrated product C is effected by recombining the non-dialyzable portion of the originally filled product, which remained in the bag, with an appropriate quantity of water. In FIG. 5, an illustrative reconstitution arrangement is depicted. Cap 20 is removed from filler neck 4 and the bag supported over the water 23 by a convenient apertured cover 24 fitted to a pitcher 25. A sharp instrument 26 is run down the filler neck 4 and used to puncture the bag 2 to release the bag contents C into the water 23. If necessary, the bag 2 is shaken in the water 23 and then withdrawn to be thrown away.

Various food products may be packaged in accordance with the present invention including citrus and other juices, coffee, tea and other beverages, soups, cereals, milk, syrups and the like already dehydrated and packaged by previously known techniques as well as many liquid products heretofore considered impractical to concentrate owing to their chemical makeup.

Numerous semi-permeable films have been tested as dialysis membranes by those in the art, particularly recently in conjunction with artificial kidney research and desalinization research. Essentially any of these films may be used in my invention. Thus any semi-permeable film, i.e. a film permeable to water but not to other components of a foodstuff in significant amount may be used. The criterion is one of selecting a film which will selectively pass water from the foodstuff into the dialyzing bath. There may be losses of sugars, and various other organics and ions from the foodstuff under certain operating conditions, which losses should be minimized by bath temperature and salt concentration adjustment to the extent such losses detract from the suitability of the product obtained.

Suitable semi-permeable films include films of cellulosic, proteinaceous or synthetic organic polymeric materials which are characterized by a digerential permeability to components of the food product to be dialyzed. Specific films that may be mentioned include 0.5 to 7.5 mil films of poly (vinyl alcohol) cellophane (regenerated cellulose), Cupraphane, cellulose acetate, polytrifluorochloroethane, sausage casing, sheeps and pigs intestines and like materials either synthetic or naturally occurring. Suitable films are selected on the main criterion of differential permeability to food product components. Suitable films are permeable to one component of a food product, like water and impermeable to others like salt ions, organic molecules and the like. Thus the term "semi-permeable" refers to this selective permeability phenomenon. Semi-permeability is found in almost all films to some degree; the foregoing materials will provide adequate semi-permeability for the present invention.

In use, a semi-permeable film selectively passes water from the food product into a more concentrated system, herein termed the dialyzing bath. Removal of water from the food product causes an increase in the osmotic pressure in the food product. Typically in the present invention this osmotic pressure is caused to rise to at least 100 pounds/square inch and preferably to 500 to 2000, up to 5000 pounds/square inch.

Osmotic pressure may be defined as the pressure a solute exerts in solution; it is equal to the pressure the solute would exert if the solute were a gas and confined in a volume equal to the solution volume. Gas pressure and osmotic pressure are intimately related. In the present invention water is transferred from the less concentrated food product to the more concentrated dialyzing salt solution bath. The transference in theory may continue as a net outflow of water from the food product until the food product and salt solution are equal in osmotic pressure due to the progressive dilution of the salt solution. In practice this condition does not occur since sufficient water, e.g. 50% to 90% of the normally present water in a food product may be removed in a matter of minutes by dialysis against an easily achieved salt bath concentration, e.g. a 1% to 10% salt solution. For example squeezed orange juice in a Cupraphane bag may be adequately dehydrated by dialysis against a 10% sodium chloride solution at 40° C. for ten minutes; milk under similar processing conditions may require 3 minutes and a 2% dialyzing solution.

Importantly, the food product in the present invention is enclosed air tightly in an air impervious, but semipermeable film. Accordingly, removal of water produces a vacuum condition in the bag as the amount of food product is relatively less after dehydration and no air can enter. It is theorized that under vacuum conditions bacteria generally occurring in food are unable to live or reproduce; accordingly food products processed according to the invention will be substantially sterile, e.g. comparable to foodstuffs maintained at 45° F. refrigeration, and without any refrigeration.

The specific vacuum condition providing inhibition of bacterial growth will vary, e.g. between 100 and 5000 p.s.i. osmotic pressure for particular products. Dehydration should be effected to the optimum antibacterial pressure condition for the given product.

The osmotic pressure in the food product may be measured by instruments known for the purpose, or roughly approximated as being equal to the pressure required on the dialyzing solution to reverse the water flow direction (reverse osmosis).

The dialyzing salt solution is an aqueous solution which is relatively more concentrated than the foodstuff to be dialyzed. Suitable dialyzing solution salts are sodium chloride, potassium chloride and the like, water soluble alkali metal salts, water soluble alkaline earth, earth metal salts such as calcium nitrate and the like, mineral salts, and other water soluble substances capable of forming a relatively more concentrated aqueous solution that occurs in the product to be concentrated, so that water will flow under osmotic pressure through the dialyzing membrane from the food product into the dialyzing salt solution. The salt solution is desirably circulated through the trough to provide fresh solution to the dialysis interface by virtue of solution movement and by virtue of reconcentration of the solution away from the bath to maintain optimum salt concentration in the bath. For this purpose the trough 6 may be provided with an inlet 27 and outlet 28 for the salt solution to recirculate between the bath and a solution reconditioning plant (not shown).

In general temperatures in the bath are not critical and can range from 40° F. to 200° F. or higher or lower, depending on the particular foodstuff being concentrated. Bath temperatures of 40 to 120° F. are particularly useful. Concentrations of salt are likewise dependent on foodstuffs; typical ranges will be 0.01 to 25% salt solution in water.

The container is desirably a bag as shown in the drawings to maximize dialysis in a given bath. Other forms of containers, such as boxes of all configurations may be used, provided a dialysis membrane for concentrating the product sealed within the container is afforded. Essentially only a portion of a wall of the container need be of dialyzing character.

I claim:
1. Method of preparing food concentrates in bags which includes operating a conveyor having a succession of bag-engaging fingers between a fill station and a rinse station, advancing a series of individual food container comprising bags formed of flexible semi-permeable film and having a relatively rigid neck ring defining a fill opening by means of said conveyor fingers engaging said bag neck rings to carry the bags in downwardly depending relation to said fill station, filling a water containing food product to be concentrated into said bags in sequence at said fill station, sealing the fill opening to seal each food product portion in an individual container, advancing the filled containers in sequence and in said depending relation through an immersion bath at a temperature between 40 and 120° F., said bath comprising a dialyzing aqueous salt solution, in a manner and for a time to raise the osmotic pressure within the container bag to at least 100 pounds/square inch and to dehydrate the food product through the semi-permeable film, and further advancing the bags to said rinse station and rinsing salt deposit therefrom at said rinse station.

2. Method according to claim 1 including also maintaining a salt concentration between 1 and 10 percent by weight in said bath.

3. Method according to claim 1 including also filling orange juice as the food product and subjecting this food product to an osmotic pressure of 500 pounds/square inch.

4. Method according to claim 1 including also filling milk as the food product and subjecting this product to an osmotic pressure between 500 and 2000 pounds/square inch.

References Cited
UNITED STATES PATENTS

| | | | |
|---|---|---|---|
| 3,062,737 | 11/1962 | Azorlosa et al. | 210—22 |
| 3,228,877 | 1/1966 | Mahon | 99—199 |
| 2,339,028 | 1/1944 | Nixon | 99—204 |
| 2,420,517 | 5/1947 | Brandner | 99—204 |
| 3,203,865 | 8/1965 | Koehler et al. | 210—22 |

FOREIGN PATENTS 1,049,685  1/1959  Germany.

OTHER REFERENCES

Marks Neidle, "The Temperature Effect in Dialysis and a Simple Rapid Dialyzer," 1916.

NORMAN YUDKOFF, Primary Examiner

C. P. RIBANDO, Assistant Examiner

U.S. Cl. X.R.

99—200, 204, 205, 208, 209; 210—22